June 17, 1952   J. J. SANDERS   2,600,432
GRINDING FIXTURE FOR SINGLE POINT TOOLS
Filed Jan. 18, 1951   2 SHEETS—SHEET 1
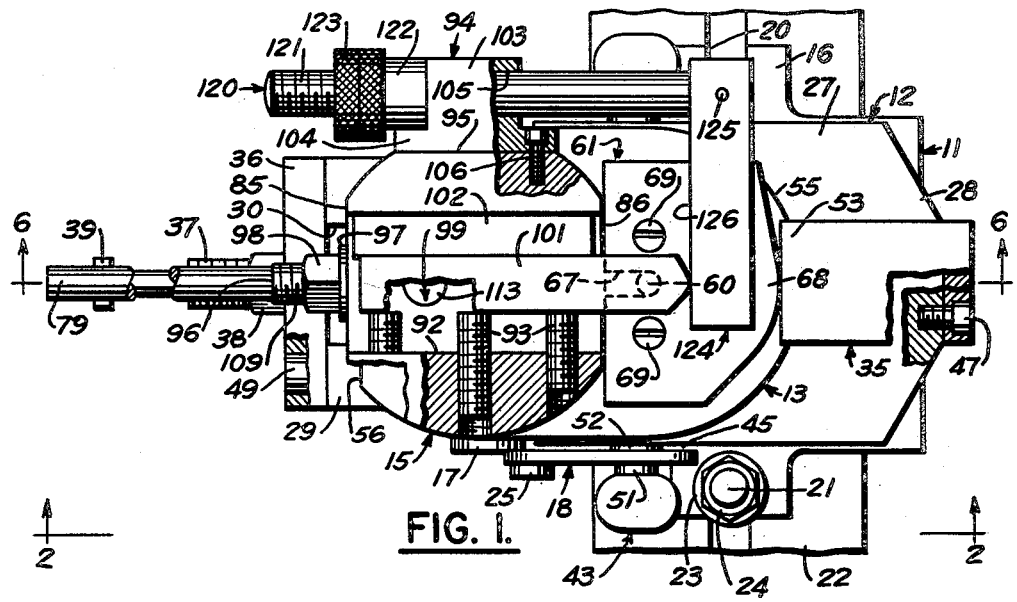
FIG. 1.
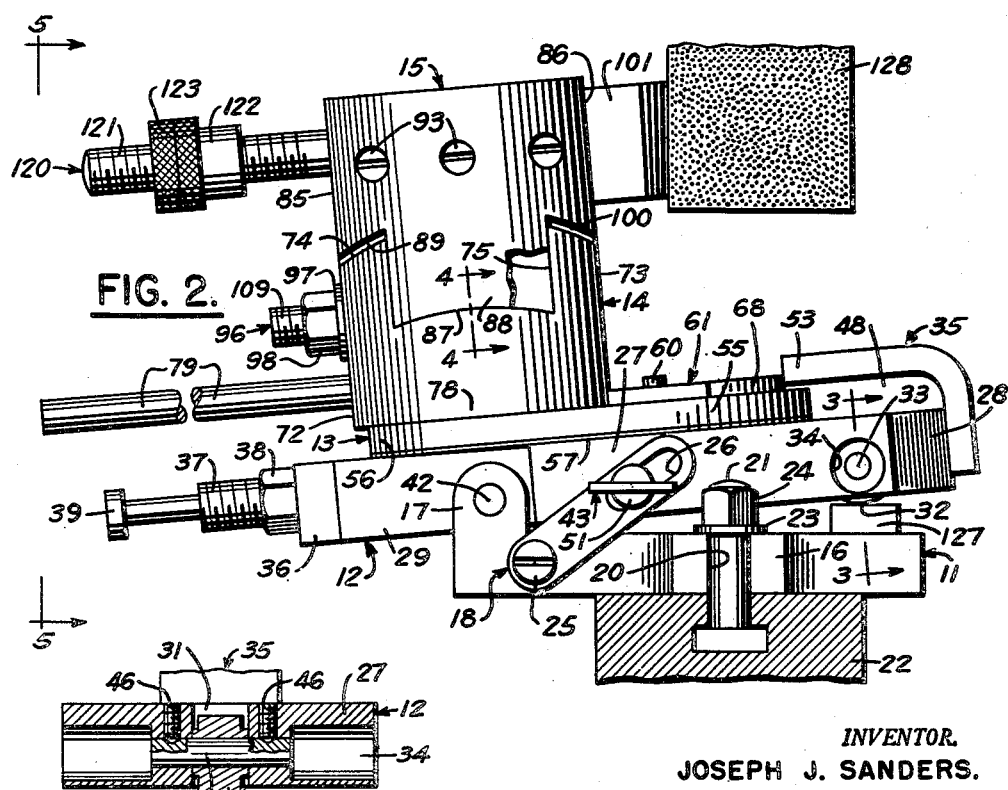
FIG. 2.
FIG. 3.
INVENTOR.
JOSEPH J. SANDERS.
BY
J. H. Church, O. Codier + H. J. Forman
ATTORNEYS.

June 17, 1952        J. J. SANDERS        2,600,432
GRINDING FIXTURE FOR SINGLE POINT TOOLS
Filed Jan. 18, 1951        2 SHEETS—SHEET 2
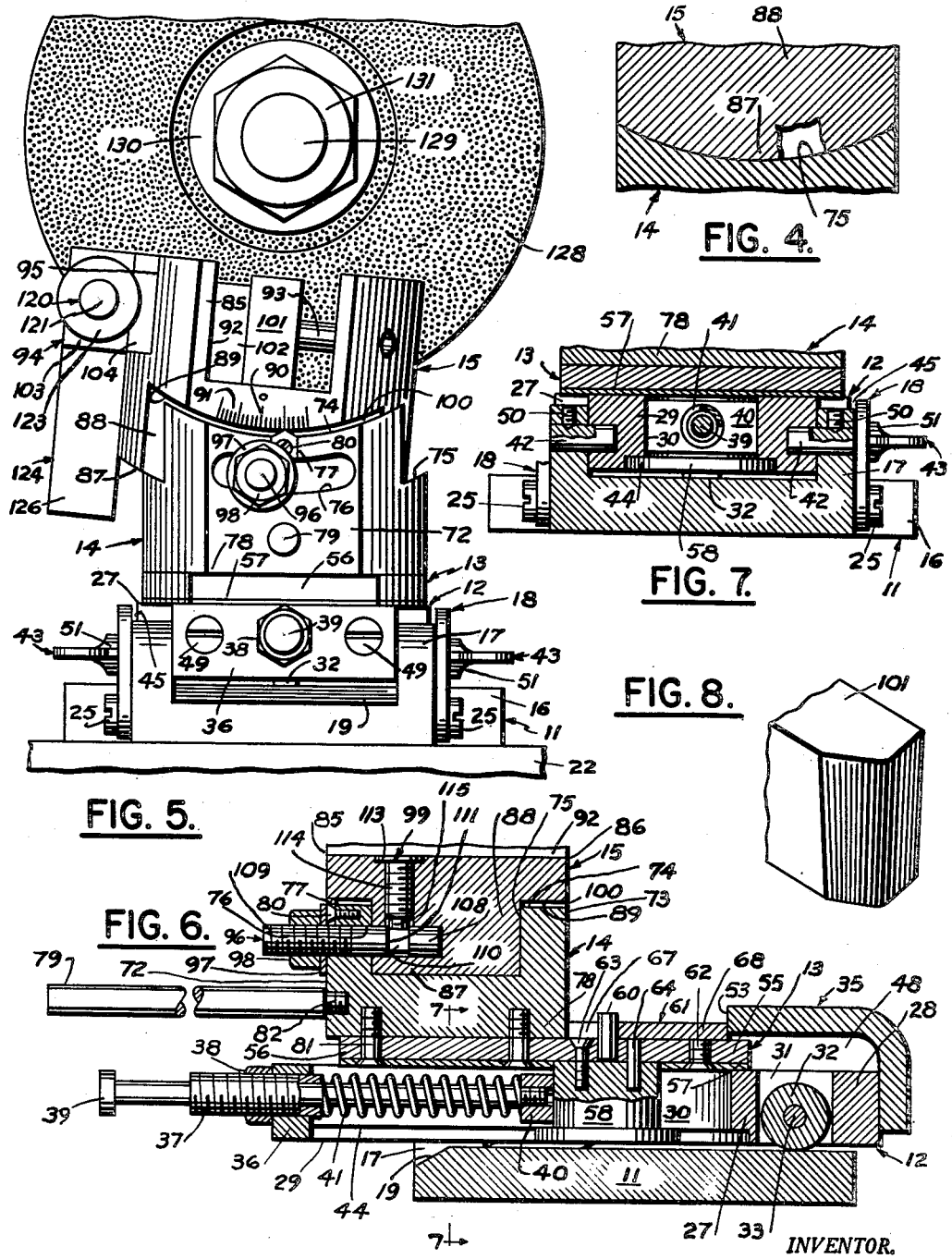
INVENTOR.
JOSEPH J. SANDERS.
BY
J. H. Church, O. Codier + H. J. Forman
ATTORNEYS.

UNITED STATES PATENT OFFICE 2,600,432

GRINDING FIXTURE FOR SINGLE POINT TOOLS

Joseph J. Sanders, Philadelphia, Pa.

Application January 18, 1951, Serial No. 206,701

2 Claims. (Cl. 51—127)

(Granted under the act of March 3, 1883, as amended April 30, 1928; 370 O. G. 757)

The invention described herein may be manufactured and used by or for the Government for governmental purposes without the payment to me of any royalty thereon.

My invention relates broadly to the art of grinding. Although not limited solely thereto, it has particular reference to the grinding of single point cutting tools of the type used on lathes, screw machines, planers, shapers, and other similar machines.

Single point cutting tools for such machines often consist of a metallic shank, square or rectangular in cross section, one end of which is shaped by grinding to form a cutting edge. The cutting edge, as viewed from above, generally is composed of two straight sides formed at an oblique angle to each other and connected by a radius. From each straight side, a flat surface issues and continues to the lower extremity of the tool as does the radius. The flat surfaces, like the two straight sides, are inclined toward each other from top to bottom; and each forms an obtuse angle in relation to the bottom of the tool. The shape of the cutting edge and the slope of its angles depend upon job requirements.

In order to grind such a cutting edge, it is necessary to position the tool at a compound angle (i. e. tilted in relation to the true horizontal and the true vertical) and then, while maintaining the compound angle, simultaneously to impart a combination of rotary and linear motions to the tool in relation to an abrasive wheel. Therefore, it is obvious that the type of grinding to which the present invention has reference is not of the ordinary profile or flat surface varieties.

Those skilled in the art realize that the dictates of mass production and interchangeable manufacturing technique in such extensive use today require that the tools themselves used in producing products be also mass produced and interchangeable. This is especially true in relation to shaped cutting tools of the type to be discussed in this specification.

Before my invention such grinding of single point tools was done in various ways which, for one reason or another, lacked the desired ease and economy of operation. One primordial technique was manually to hold and guide the tool against a revolving abrasive wheel, but this is admittedly very hazardous, inefficient, and inconsistent in result.

A later method of doing this type of grinding consisted of rigidly mounting the tool upon the table of a grinding machine so that one flat surface could be ground. In order to grind the second flat surface, the set-up had to be changed, or another machine had to be used. Then the radius connecting the two surfaces had to be ground by manually holding and guiding the tool against another grinding wheel. Obviously, the multiple setting-up of one machine, or the use of two separate machines, was costly and time consuming. Further disadvantage of this method was the final radius-grinding by manual guidance. Even with the use of grinding templets, a further hindrance, the results were inadequate and the process inefficient.

The art is rich with ways and means of grinding profiles on cylindrical and flat workpieces; but the proper grinding of a single point cutting tool of the type here discussed, in order to retain tool strength and to obtain maximum cutting efficiency, requires more than the forming of a profile. Best results in grinding single point cutting tools are obtained by using the face of an abrasive wheel rather than its periphery and, until the advent of my inventive fixture, the art lacked any single means of accomplishing the proper grinding of single point tools with but one set-up of the workpiece.

Although the shapes and sizes of cutting edges on single point tools are many and varied, I shall illustratively discuss the grinding of a cutting edge requiring compound angular setting of my grinding fixture. However, such compound angular setting may not always be required. In such cases the grinding process is further simplified.

In practicing my invention I provide a fixture which is easily attached to the work table of any simple grinding machine. The fixture consists of a base plate upon which is pivotally mounted an angle plate. This arrangement permits the angle plate to be set parallel or at an inclination to the base plate.

Slidably and rotatably engaged to the angle plate is a slide plate upon which are mounted a vise base and a template. The vise base is arcuately grooved parallel to the pivotal mounting between the base and angle plate in order adjustably to accommodate a vise block for holding the tool to be ground. This vise block can be set at an angle to the vise base. The combination of the available angular setting between the vise base and the vise block, and the angular setting possible between the base plate and the angle plate, makes the fixture capable of compound angle adjustment. A portion of the template is shaped to correspond to the cutting edge of the tool to be ground, but the shape on the template is considerably enlarged over that required to be ground upon the tool. The shaped edge of the template is constantly urged by spring pressure against a stop bar which is secured to the angle plate.

By oscillation of an operating handle secured to the vise base, the tool to be ground is moved up and back past the machine's grinding wheel. Depending upon the shape of the template, the vice block containing the tool is also capable of linearly advancing or withdrawing from the grinding wheel as the tool is oscillated, so that the template's profile is imparted, in reduced size, to the tool being ground. The available compound angular setting of the vise block provides the proper grinding of the two flat surfaces flanking the rounded point.

One object of my invention is to provide a compact tool grinding fixture, comparatively small in relation to grinding machines, which is capable of simultaneous compound angular adjustment and separate or combined curvilinear or rectilinear movement.

Another object is to provide a grinding fixture which can be used on the most simple type of grinding machine.

A further object is to provide a grinding fixture which will eliminate the necessity for multiple set-ups of a single machine, or the need for more than one grinding machine in forming desired profiles on cutting tools.

The foregoing and other objects and advantages of my invention will become apparent from an inspection of the following description and the accompanying drawings, wherein:

Fig. 1 is a top view of my inventive fixture, partly in section and partly broken away, secured to the work table of a small surface grinding machine, or the like. The tool to be ground is shown abutting the fixture's gaging arm as is necessary preceding the grinding operation. For simplicity of drawing, no angular adjustments of the fixture are shown;

Fig. 2 is a side view as seen from line 2—2 of Fig. 1, but the fixture's gaging arm has been changed to the position it possesses during the grinding operation, and one of the various possible angular settings has been made in the fixture. Also shown is a portion of the grinding machine's abrasive wheel in one initial position relative to the tool being ground;

Fig. 3 is a vertical cross section taken along line 3—3 of Fig. 2 to show how a roller is positioned in the fixture's angle plate;

Fig. 4 is a vertical cross section taken along line 4—4 of Fig. 2, showing the engagement between the fixture's vise base and its vise block;

Fig. 5 is an end view as seen from line 5—5 of Fig. 2. For simplicity of drawing, the angular setting shown in Fig. 2 has been removed and one of the other possible angular settings has been made;

Fig. 6 is a longitudinal vertical section taken along line 6—6 of Fig. 1 to show the internal construction of my novel fixture;

Fig. 7 is a vertical cross section taken along line 7—7 of Fig. 6, showing the pivotal connection between the fixture's base and angle plates, and also the attachment between the side plate and the angle plate; and Fig. 8 is a partial perspective view showing the cutting edge of an illustrative single point cutting tool.

Essentially my fixture will be seen to consist of a base plate 11, an angle plate 12, a slide plate 13, a vise base 14 and a vise block 15. Other elements, accessory to these major components just named, are employed and will be discussed in connection therewith.

*The base plate*

Base plate 11 is shown in Figs. 1, 2 and 5 to 7. Viewed from above (see Fig. 1), the base plate is substantially rectangular in area and is provided with mounting lugs 16, pivot lugs 17, and setting arms 18. The base plate is also provided with a bevel 19 (see Figs. 5 and 6).

Mounting lugs 16 (see Figs. 1, 2, 5 and 7) project horizontally from opposite sides of the base plate. Each lug is provided with an open end slot 20 which accommodates a T bolt 21 by means of which the fixture is secured to the work table 22 of a simple grinding machine. Aiding this attachment are washers 23 and nuts 24 (one each of which is shown in Figs. 1 and 2).

Pivot lugs 17 are shown in Figs. 1, 2, 5 and 7. They project upwardly from one end of base plate 11 and are in opposed, spaced relationship to each other.

Setting arms 18 (see Figs. 1, 2, 5 and 7) are secured to base plate 11 by means of the shoulder screws 25 about which they are free to pivot. The opposite end of each setting arm is provided with a slot 26 whose purpose will become apparent later.

Bevel 19, shown in Figs. 5 and 6, extends across the base plate's upper surface between pivot lugs 17 and slopes downward from the base's top surface. Its purpose is to provide space to accommodate angle plate 12, described below, when that plate is set at an angle to base plate 11.

*The angle plate*

Angle plate 12 is shown in Figs. 1 to 3 and 5 to 7. As viewed from above (see Fig. 1) the angle plate consists of a wide portion 27 having the beveled end 28 and a stepped down, narrower portion 29. Wide portion 27 is slightly less in dimension than the width of base plate 11 so that a space 45 exists between the two parts on each side of the fixture's longitudinal center line. Narrower portion 29 of the angle plate fits into the space between mounting lugs 16 of base plate 11 so that limited angular adjustment between the base plate and the angle plate is possible, as will be explained later. Other elements of the angle plate are an open-end, shouldered stud slot 30, a roller recess 31, a roller 32, a roller pin 33, a roller pin recess 34, an L-shaped stop bar 35, a closure bar 36, a threaded stud 37, a lock nut 38, a shoe rod 39, a shoe 40, a spring 41, the pivots 42, and the thumb screws 43.

Open-end, shouldered stud slot 30 is shown in Figs. 1, 6 and 7. It is located substantially midway between the angle plate's sides (see Figs. 1 and 7) and extends lengthwise of the plate from left to right (see Fig. 6). Near its lower extremity is a shoulder 44.

Roller recess 31 (see Fig. 6) is likewise located substantially midway between the angle plate's sides just adjacent the inner end of shouldered stud slot 30. Roller 32 is mounted in the recess by means of roller pin 33 located within the roller pin recess 34 (see Figs. 2 and 3) and is secured there by means of set screws 46 (see Fig. 3).

The axis of roller pin 33 is parallel to the angle plate's upper and lower surfaces, and is so positioned that the lower extremity of roller 32 extends somewhat below the lower surface of angle plate 12 (see Figs. 2, 3, 5 and 6).

L-shaped stop bar 35, having a free end 53, is shown in Figs. 1, 2, 3 and 6. It is secured to beveled end 28 of angle plate 12 by means of screws 47 (one of which is shown in Fig. 1) so that an appreciable space 48 exists vertically between it and the top surface of the angle plate as shown in Figs. 2 and 6.

Closure bar 36 is shown in Figs. 1, 2, 5 and 6. It is secured to angle plate 12 across shouldered stud slot 30 by means of screws 49 (see Figs. 1 and 5). Passing through the closure plate in alignment with shouldered stud slot 30 is threaded adjusting stud 37 which is adjustably secured in position by lock nut 38.

Shoe rod 39 is shown in Figs. 1, 2, and 5 to 7. This rod is slidably supported within threaded adjusting stud 37 and is threadedly attached, at its inner end, to shoe 40 (see Figs. 6 and 7).

Spring 41, which is shown in Figs. 6 and 7, fits around rod 39 and is confined between shoe 40 and threaded stud 37. By this arrangement the shoe is constantly urged toward the closed end of shouldered stud slot 30.

Pivots 42 are shown in Figs. 2 and 7. They are located opposite each other in appropriate recesses near the angle plate's left end (see Fig. 2). The pivots, about which the angle plate is free for limited rotation, connect angle plate 12 to base plate 11 to which they are secured by means of set screws 50 located in pivot lugs 17 (see Fig. 7). The congruous axes of the pivots are so located in relation to the lower surface of the angle plate that in the Fig. 6 position the angle plate and the base plate are parallel.

In addition, the distance between the axes of pivots 42 and roller pin 33 is such a dimension (preferably 4.000") so that angular setting between base plate 11 and angle plate 12 will be facilitated. For example (referring to Fig. 2), insertion of a certain thickness of gage block 127 between roller 32 and base plate 11 will establish a certain specific angular relation between the base plate and the angle plate. Other angles can be established by the use of other appropriately sized gage blocks.

Thumb screws 43 are shown in Figs. 1, 2, 5 and 7. These screws slidably fit through slots 26 in setting arms 18 and thread into opposed, accommodating recesses (not shown) in the sides of angle plate 12. The heads 51 of the thumb screws bear against the setting arms so as to exert a clamping force thereon. Space 45 existing between the inner surface of the setting arms and the corresponding side of the angle plate is consumed by washers 52 (see Fig. 1) which fit around the thumb screws' shanks.

The slide plate

Slide plate 13 is shown in Figs. 1, 2 and 5 to 7. As viewed from above (see Fig. 1) it is oblong in shape having a rounded end 55 and a blunt end 56. Attached to the slide plate are a wear plate 57, a cylindrical shouldered stud 58, a vise base 14, a template stud 60, and a template 61.

Wear plate 57, shown in Figs. 2 and 5 to 7, is substantially identical in area to slide plate 13 and is attached to its under surface by means of screws 62 (one of which is shown in Fig. 6).

Cylindrical shouldered stud 58 is shown in Figs. 6 and 7. It passes through an accommodating opening in wear plate 57 and is secured to the slide plate's lower surface by means of screws 63 and dowels 64 (one each of which is shown in Fig. 6). The shouldered stud engages shouldered stud slot 30 in angle plate 12 so that slide plate 13 and its attached wear plate 57 are joined to the angle plate so as to be freely slidable along or rotatable in the shouldered stud slot.

As seen in Figs. 2 and 6 the combined thickness of wear plate 57 and slide plate 13 is slightly less than space 48 between angle plate 12 and the portion of stop bar 35 parallel therewith.

Vise base 14, although an adjunct of slide plate 13, will be described later under a separate heading.

Template stud 60 is shown in Figs. 1, 2 and 6. It is press-fitted in slide plate 13 directly above the center of shouldered stud 58, and projects somewhat above the slide plate's upper surface to serve as a means of locating the various interchangeable templates which may be used on the fixture.

Template 61 appears in Figs. 1, 2 and 6. The template, which is made of plate stock, has a slot 67 and a shaped end 68. This template is one of a number usable on my fixture and having variously shaped ends, depending upon requirements for the tools to be ground. Slot 67 (see Figs. 1 and 6), in conjunction with template stud 60, locates the template upon slide plate 13 to which it is secured by means of screws 69. The template's shaped end 68 (see Fig. 1) conforms to the shape of a cutting edge that it is desired to grind upon a tool, but for practical purposes it is desirable to make the shape on the template approximately one inch larger all around than the actual size of the tool's cutting edge to be ground. In this way, templates are more easily and more accurately made.

As shown in Fig. 6, shaped end 68 of template 61 is constantly urged against free end 53 of stop bar 35 through the action of spring 41 against shoe 40, cylindrical shouldered stud 58, and slide plate 13. Moreover, the slide plate is capable of independent or simultaneous oscillatory or sliding motion in relation to angle plate 12 so that the template's shape is reproduced on the tool being ground.

The vise base

Vise base 14 is shown in Figs. 2 and 4 to 7. As viewed from above, the vise base has the same shape as vise block 15 (see Fig. 1) later to be described. In other words, vise base 14 is cylindrical having oppositely located parallel flats 72 and 73 which extend from top to bottom (see Figs. 2, 5 and 6). Also to be considered in connection with the vise base are the upper arcuate end 74, the arcuate groove 75, the arcuate slot 76, the pointed indicator 77, the flat lower end 78, and the operating handle 79.

Upper arcuate end 74 of vise base 14 is shown in Figs. 2, 5 and 6. This end is arcuately shaped about an axis (not shown) which lies parallel to lower flat end 78 in an imaginary plane that perpendicularly bisects flats 72 and 73.

Arcuate groove 75 (shown in Figs. 2 and 4 to 6) is also generated in the vise base's upper end about the same axis, so that the groove is concentric to upper arcuate end 74 and is also parallel to flats 72 and 73.

Arcuate slot 76 which extends between flat 72 and arcuate groove 75 (see Figs. 5 and 6) likewise is generated about the same axis so that it also is concentric to upper arcuate end 74.

Pointed indicator 77 is shown in Figs. 5 and 6. It is located in an accommodating groove in flat 72 where it is secured by means of a screw 80.

The indicator's point is in alignment with the axis (not shown) about which upper arcuate end 74, arcuate groove 75, and arcuate slot 76 are generated. Physically, the point extends slightly outside the limit of the upper arcuate end so as to be in proximity to a portion of vise block 15 later to be described.

Flat lower end 78 of vise base 14 is shown in Figs. 2 and 5 to 7. It provides for the perpendicular mounting of the vise base upon slide plate 13 by means of screws 81 (see Fig. 6). Vise base 14, in addition to being perpendicular to slide plate 13, is so positioned upon the slide plate that arcuate groove 75 is parallel to the axis of pivots 42.

Operating handle 79 is shown in Figs. 1, 2, 5 and 6. As the last-named figure shows, the handle is threadedly attached at 82 to vise base 14. It will be obvious from the foregoing description and drawings that oscillation of the handle will cause a corresponding oscillation of slide plate 13. The shaped end 68 of template 61 during the while is constantly urged against stop bar 35. As a result, besides the oscillatory movement, slide plate 13 is free to move linearly in relation to angle plate 12 because of the coaction between shouldered stud 58 and shouldered stud slot 30.

*The vise block*

Vise block 15 is shown in Figs. 1, 2 and 4 to 6. From above (see Fig. 1) its shape is substantially cylindrical except for diametrically opposed flats 85 and 86 which are substantially coplanar with flats 72 and 73 on vise base 14 (see Figs. 2 and 6). Also to be considered in connection with the vise block are its lower arcuate end 87, the tongue 88, the arcuate shoulder 89, the reference mark 90, the graduations 91, the tool groove 92, the set screws 93, the bracket 94, the flat 95, the clamp stud 96, the washer 97, the lock nut 98, and the locating stud 99.

Lower arcuate end 87 is best shown in Figs. 4 and 5. This end is generated about the same axis (not shown) earlier described which is common to the upper arcuate end 74, arcuate groove 75, and arcuate slot 76 of vise base 14. In dimension the radius of lower arcuate end 87 is substantially the same as that of arcuate groove 75 so that vise block 15 bears upon and is well supported by the groove.

To facilitate the engagement between vise block 14 and vise block 15, tongue 88 is formed on the vise block's lower arcuate end (see Figs. 2 and 4 to 6). The tongue is parallel to flats 85 and 86 and is of such width as to slidably fit into arcuate groove 75 in vise base 14.

Arcuate shoulder 89 is shown in Figs. 2, 5 and 6. This shoulder determines the upper limit of tongue 88 and is struck about the same axis as the vise block's lower end 87. Dimensionally, shoulder 89 is somewhat less in radius than upper arcuate end 74 of vise base 14, so that a small space 100 is provided between members 89 and 74 for pointed indicator 77 (see Figs. 5 and 6).

Reference mark 90 and graduations 91 are shown in Fig. 5. They are inscribed on the lower end of flat 85 and originate from the axis of generation (not shown) of arcuate shoulder 89. The central reference mark 90 is vertically beneath that axis so that, when aligned with pointed indicator 77, the bottom of tool groove 92 (later to be described) will be substantially parallel to angle plate 12. Graduations 91 on each side of central reference mark 90 indicate angular displacement of the vise block in relation to an imaginary vertical plane (not shown). Note that in Fig. 5 an angular displacement of approximately 5 degrees to one side is indicated.

Tool groove 92 is shown in Figs. 1 and 5. This flat bottomed, straight sided groove is formed in the flat upper end of vise block 15 and extends perpendicularly across the block's arcuate tongue 88. In order securely to clamp the tool 101 for grinding, set screws 93 are provided which extend through one wall of the tool groove (see Figs. 1, 2 and 5). As seen from Figs. 1 and 5 the tool groove may be wider than the tool to be ground. In such cases, the tool can be properly positioned from the groove's other wall by the use of a spacer bar 102. Needless to say, any convenient size of spacer may be used depending on the width of the tool to be ground.

Bracket 94 is shown in Figs. 1 and 5. It is merely a metallic block consisting of a body portion 103 and a base 104. The body portion is recessed at 105 for a purpose later to be described. The bracket is secured to flattened portion 95 of vise block 15 by means of screws 106 (one of which is shown in Fig. 1).

Clamp stud 96 is shown in Figs. 1, 2, 5 and 6. Referring to Fig. 6, the stud consists of a plain portion 108 and a threaded portion 109. Near the end of the plain portion are four flats 110 arranged in alignment to form a continuous groove 111 around the stud, the resulting cross section (not shown) through the groove forming a square. The plain portion of the stud is accommodated in a recess within vise block 15, allowing the remainder of the stud to project through and beyond arcuate slot 76 in vise base 14. The threaded portion of the stud is equipped with washer 97 and nut 98 (see Figs. 1, 2, 5 and 6).

Clamp stud 96 is retained in position by means of locating stud 99 (see Figs. 1 and 6). This stud is comprised of a head 113, a body 114, and a tip 115. As shown in Fig. 6, it is accommodated in a counterbored, threaded recess in vise block 15 so that tip 115 engages continuous groove 111 in clamp stud 96. This engagement prevents the clamp stud from turning and from being pulled out of the vise block when nut 98 is tightened for the purpose of maintaining the adjustable relationship between vise block 15 and vise base 14.

Bracket 94 accommodates a gage arm 120 shown in Figs. 1, 2 and 5. The gage arm consists of a threaded shank 121, on which are mounted an adjusting knob 122, a lock knob 123, and a locating bar 124. The threaded shank is slidably and rotatably accommodated in recess 105 of bracket 94. Locating bar 124 is secured to the right end (see Fig. 1) of the threaded shank by means of a pin 125.

The gage arm is capable of two positions: one, a setting position (see Fig. 1); the other, a retracted position (see Figs. 2 and 5). In the setting position the inner face 126 of the locating bar is spaced approximately one inch horizontally from free end 53 of stop bar 35. Tool 101 to be ground is placed in vise block 15 and extended until the end of the tool abuts the locating bar's inner face 126 (see Fig. 1). After the tool has been clamped in place, the locating bar is moved to its retracted position (see Figs. 2 and 5) so as not to interfere with the fixture's operation during the grinding process.

Operation

The operation of my novel fixture is exceedingly simple and is performed in the manner now to be described. For our present purpose, the grinding machine's abrasive wheel 128 is represented in Figs. 2 and 5. The wheel, which may be either of the disc or cupped type, is secured to the machine's spindle 129 by means of a washer 130 and a nut 131. It shall be assumed that a tool, preferably one of a number of like tools, is to be ground for a certain job, and that no template is on the fixture. First, the particular template for the tool and/or tools to be ground is positioned about locating stud 60 and secured to slide plate 13 by means of screws 69 (see Figs. 1, 2 and 6).

By positioning adjusting knob 122 and lock knob 123, locating bar 124 is placed so that its inside face 126 is approximately one inch from the end 53 of stop bar 35. When so positioned, lock knob 123 is tightened against adjusting knob 122 thereby securing the adjustment.

The tool to be ground is placed in tool groove 92. While manually holding locating bar 124 in its path, the tool is pushed toward the locating bar until the edge of the tool abuts the bar as shown in Fig. 1. From the bracket side of the tool groove, the tool is "packed out" by means of spacer 102 until the center of the radius of the tool is substantially in alignment with the center of the radius of the template. Set screws 93 are then tightened, securing the tool in position for grinding.

Information supplied by the tool designer will specify just what the angular settings of angle plate 12 and the vise block 15 should be. The setting of the angle plate is obtained in well known fashion by placing a specified gage block 127 between roller 32 and base plate 11 (see Fig. 2). Roller 32 greatly facilitates such placement and removal of the gage block, and minimizes wear on both the gage block and the parts contacted thereby. When the angle is set thumb screws 43 are tightened to secure the setting. The setting of vise block 15 is accomplished by tilting it the required amount to the left or right (see Fig. 5) as indicated by graduations 91. When set, the position is secured by means of clamp nut 98.

The fixture is then secured in conventional manner to the table 22 of a simple grinding machine by means of T bolts 21, washers 23, and nuts 24 (one of each of which is shown in Figs. 1 and 2).

In order to get the proper relationship between the grinding machine's abrasive wheel 128 and my novel fixture, the grinder's work table 22 is adjusted by well known means toward or away from the wheel until contact between the wheel and tool 101 is just made (see Figs. 1, 2, 5). The work table is then moved longitudinally away from the machine's grinding wheel until the end of the tool is free of the wheel's face. The work table is then adjusted the preferred depth of grind closer to the grinding wheel which, in the meantime, is caused to rotate.

Work table 22 carrying fixture and tool is moved longitudinally back toward the grinding wheel. As the tool and wheel make contact, and grinding is started, the central position of the slide plate is preserved by maintaining a hold on operating handle 79. The table is fed across the wheel until the tool is approximately vertically beneath the wheel's center. Longitudinal movement of the table is then stopped and operating handle 79 is oscillated so as to cause template 61 to move past stop bar 124. As a result, the tool is made to follow a path equivalent to the shape of the template, although on a smaller scale, as the cutting edge is being ground.

The work is then moved longitudinally away from the wheel, and the ground tool is removed. The fixture is reloaded with another tool and the process is repeated.

Those skilled in the art realize that many modifications and variations of my inventive device are possible without departing from its original spirit and scope. For that reason, I do not wish to be limited by the narrow confines of the single practical embodiment here disclosed and described for illustrative reasons only, but instead only by the claims appended hereto.

From the foregoing it will be apparent that I have provided a small, compact grinding fixture which is capable of simultaneous compound angular adjustment and separate or combined curvilinear or rectilinear movement; that I have provided a grinding fixture which can be used on the most simple type of grinding machine; and that I have provided a grinding fixture which will eliminate the necessity for multiple set-ups of a single machine, or the need for more than one machine in forming desired profiles on cutting tools.

I claim:

1. In apparatus for grinding of profiles and clearances therefor on single point cutting tools, the combination of a rotatable grinding wheel, a work table adjacent to said grinding wheel and positionally adjustable with respect thereto, a fixture base mounted on said table, an angle plate pivotally mounted on said fixture base so as selectively to form different angles therewith, means for maintaining said angle plate at any desired angle with respect to said fixture base, a stop bar secured to said angle plate, a slide plate mounted on said angle plate for pivotal rotation about a perpendicular to the face of said angle plate and for sliding movement toward and away from said stop bar, a template removably secured to said slide plate and having a profile conforming to that desired to be ground on a cutting tool, resilient means constantly urging said slide plate and template thereon in the direction of said stop bar so that said template's profile is constantly abutting the stop bar, a vise base mounted on said slide plate and having an upper arcuate extremity, a vise block for supporting the tool to be ground and having an arcuate lower extremity which is matingly engageable with the upper arcuate extremity of said base base at different angular positions in a plane perpendicular to the face of said angle plate, a locating bar attached to said vise block and removably positionable for use in setting the tool to be ground the proper distance from said stop bar, and an operating handle secured to said vise base, whereby oscillatory movement applied to said handle causes movement of the slide plate from side to side, forward and backward as different portions of the template's profile push against the stop bar, thereby causing the tool to move into contact with said grinding wheel along a path conforming to the profile of the template and at a compound angle caused by the angular settings of the angle plate and the vise block.

2. A tool shaping fixture comprising, a base plate, an angle plate having a stop bar and being supportable in various angular relationships to said base plate, a slide plate keyed to said angle plate for pivotal rotation within a preselected limited area about a perpendicular to the face of said angle plate, a template removably secured to said slide plate and having a profile conforming to that desired to be ground on a cutting tool, resilient means constantly urging said slide plate and template thereon in the direction of said stop bar so that said template's profile is constantly abutting the stop bar, a vise base carried by said slide plate and having an arcuate free end, a vise block for supporting a tool to be shaped and having an arcuate end for mating engagement with the arcuate free end of said vise base, scale and pointer means for indicating the lateral displacement of said vise base with respect to said vise block, and a roller mounted in said angle plate so that a portion of the roller surface constantly protrudes from the plate's lower surface to provide a fixed reference line for determining by means of a standard gage block the angular distance between the angle plate and said base plate, the named elements cooperating to make possible the uniform supporting of successive tools to be shaped at a compound angle caused by the angular settings of the angle plate with respect to said base plate and of the vise block with respect to said vise base, and to move tools thus supported along a path which conforms to the shape of the template's profile.

JOSEPH J. SANDERS.

REFERENCES CITED

The following references are of record in the file of this patent:

UNITED STATES PATENTS

| Number | Name | Date |
| --- | --- | --- |
| 1,255,962 | Warner et al. | Feb. 12, 1918 |
| 2,375,619 | Bura | May 8, 1945 |
| 2,475,796 | Mader | July 12, 1949 |